United States Patent
Benjamin et al.

(10) Patent No.: US 8,998,502 B2
(45) Date of Patent: Apr. 7, 2015

(54) FIBER OPTIC CONNECTORS AND FERRULES AND METHODS FOR USING THE SAME

(75) Inventors: Seldon David Benjamin, Painted Post, NY (US); Michael de Jong, Colleyville, TX (US); Randy LaRue McClure, Corning, NY (US); Howard Clark Schwartz, Dallas, TX (US)

(73) Assignee: Corning Incorporated, Corning, NY (US)

( * ) Notice: Subject to any disclaimer, the term of this patent is extended or adjusted under 35 U.S.C. 154(b) by 159 days.

(21) Appl. No.: 13/217,415

(22) Filed: Aug. 25, 2011

(65) Prior Publication Data

US 2012/0057829 A1     Mar. 8, 2012

Related U.S. Application Data

(60) Provisional application No. 61/379,927, filed on Sep. 3, 2010.

(51) Int. Cl.
 G02B 6/36     (2006.01)
 G02B 6/25     (2006.01)
 G02B 6/38     (2006.01)

(52) U.S. Cl.
 CPC . G02B 6/25 (2013.01); G02B 6/382 (2013.01); G02B 6/3849 (2013.01)

(58) Field of Classification Search
 CPC ............................ G02B 6/3847; G02B 6/3849
 See application file for complete search history.

(56) References Cited

U.S. PATENT DOCUMENTS

| | | | | |
|---|---|---|---|---|
| 3,980,390 | A | | 9/1976 | Yamamoto et al. |
| 4,368,948 | A | * | 1/1983 | Despouys ........................ 385/87 |
| 4,582,392 | A | | 4/1986 | Williams et al. |
| 4,907,132 | A | * | 3/1990 | Parker ........................... 362/556 |
| 4,984,868 | A | | 1/1991 | ten Berge |
| 5,042,900 | A | * | 8/1991 | Parker .............................. 385/76 |
| 5,071,218 | A | * | 12/1991 | Nishimoto ..................... 385/60 |
| 5,081,694 | A | | 1/1992 | Rhoese |
| 5,082,344 | A | * | 1/1992 | Mulholland et al. ............. 385/60 |
| 5,208,887 | A | * | 5/1993 | Grinderslev .................... 385/81 |
| 5,216,734 | A | * | 6/1993 | Grinderslev .................... 385/60 |
| 5,233,677 | A | | 8/1993 | Winslow |
| 5,381,504 | A | | 1/1995 | Novack et al. |
| 5,553,181 | A | | 9/1996 | vanWoesik |
| 5,559,917 | A | | 9/1996 | Ott .................................. 385/86 |
| 5,574,815 | A | | 11/1996 | Kneeland |
| 5,668,904 | A | | 9/1997 | Sutherland et al. |
| 5,737,471 | A | * | 4/1998 | Sugiyama et al. ............ 385/123 |
| 5,796,894 | A | * | 8/1998 | Csipkes et al. .................. 385/56 |
| 5,862,282 | A | * | 1/1999 | Matsuura et al. ............... 385/86 |

(Continued)

FOREIGN PATENT DOCUMENTS

| EP | 4257803 | 9/1992 |
|---|---|---|
| EP | 0347118 | 3/1994 |

(Continued)

*Primary Examiner* — Rhonda Peace
(74) *Attorney, Agent, or Firm* — Svetlana Short

(57) ABSTRACT

According to at least one exemplary embodiment a ferrule, comprises: (i) a bore extending from a rear of the ferrule to a front of the ferrule, wherein the bore is sized to receive an optical fiber and a buffer layer at one end face of the ferrule; and (ii) an end stop sized to engage the buffer layer and to contain the optical fiber within said ferrule. In some embodiments the ferrule includes an optical fiber situated within the bore.

26 Claims, 14 Drawing Sheets

(56) References Cited

U.S. PATENT DOCUMENTS

| | | | |
|---|---|---|---|
| 5,923,805 A | 7/1999 | Anderson et al. | |
| 6,033,124 A | 3/2000 | Lesueur et al. | |
| 6,174,091 B1 | 1/2001 | Herrmann | |
| 6,181,865 B1 * | 1/2001 | Saviano | 385/139 |
| 6,215,943 B1 * | 4/2001 | Crotts et al. | 385/137 |
| 6,249,631 B1 | 6/2001 | LeVey et al. | |
| 6,379,055 B1 | 4/2002 | Uken | |
| 6,443,628 B1 | 9/2002 | Horie et al. | |
| 6,702,478 B2 | 3/2004 | Inagaki et al. | |
| 6,733,187 B2 * | 5/2004 | Page et al. | 385/78 |
| 6,960,027 B1 * | 11/2005 | Krah et al. | 385/78 |
| 7,014,370 B2 | 3/2006 | Chudoba | |
| 7,241,056 B1 | 7/2007 | Kuffel et al. | |
| 7,242,835 B2 * | 7/2007 | Busse et al. | 385/125 |
| 7,341,383 B2 * | 3/2008 | Droege et al. | 385/78 |
| 7,712,973 B2 * | 5/2010 | DiMarco | 385/81 |
| 7,751,661 B2 * | 7/2010 | Kadomi et al. | 385/36 |
| 8,104,974 B1 * | 1/2012 | Gurreri | 385/72 |
| 8,189,978 B1 * | 5/2012 | Bennett et al. | 385/127 |
| 8,337,095 B2 * | 12/2012 | Dean et al. | 385/84 |
| 8,511,910 B2 * | 8/2013 | Ohtsuka et al. | 385/78 |
| 2002/0084301 A1 | 7/2002 | Murgatroyd | |
| 2002/0118928 A1 * | 8/2002 | Roehrs et al. | 385/84 |
| 2002/0191919 A1 * | 12/2002 | Nolan | 385/78 |
| 2003/0039450 A1 * | 2/2003 | Page et al. | 385/76 |
| 2003/0174974 A1 * | 9/2003 | Yasuda et al. | 385/80 |
| 2003/0190130 A1 * | 10/2003 | Welker et al. | 385/126 |
| 2004/0096178 A1 * | 5/2004 | Jones et al. | 385/140 |
| 2004/0109646 A1 * | 6/2004 | Anderson et al. | 385/71 |
| 2004/0117981 A1 * | 6/2004 | Roth et al. | 29/828 |
| 2005/0286835 A1 | 12/2005 | Maxey | |
| 2008/0013905 A1 * | 1/2008 | Bookbinder et al. | 385/124 |
| 2008/0279516 A1 * | 11/2008 | Chen et al. | 385/124 |
| 2008/0304794 A1 | 12/2008 | Kato et al. | |
| 2008/0304795 A1 | 12/2008 | Oike et al. | |
| 2009/0087148 A1 | 4/2009 | Bradley et al. | |
| 2009/0103870 A1 | 4/2009 | Solomon et al. | |
| 2010/0290740 A1 * | 11/2010 | Ohtsuka et al. | 385/60 |
| 2011/0044588 A1 * | 2/2011 | Larson et al. | 385/81 |
| 2011/0081116 A1 * | 4/2011 | Nakagawa | 385/78 |
| 2011/0085772 A1 | 4/2011 | Benjamin et al. | |
| 2011/0091165 A1 * | 4/2011 | Benjamin et al. | 385/81 |
| 2011/0091166 A1 * | 4/2011 | Benjamin et al. | 385/81 |
| 2011/0217011 A1 * | 9/2011 | Bennett et al. | 385/124 |
| 2012/0057829 A1 * | 3/2012 | Benjamin et al. | 385/78 |

FOREIGN PATENT DOCUMENTS

| | | |
|---|---|---|
| EP | 2075605 | 7/2009 |
| JP | 09090183 | 4/1997 |
| JP | 204117794 | 4/2004 |

* cited by examiner

Insertion Force vs Radial Tolerance $y=-61679E+06x^3+2.6951E+04x^2-2.8726E+02x +5.4118E-01$
$R^2=1.0000E+00$

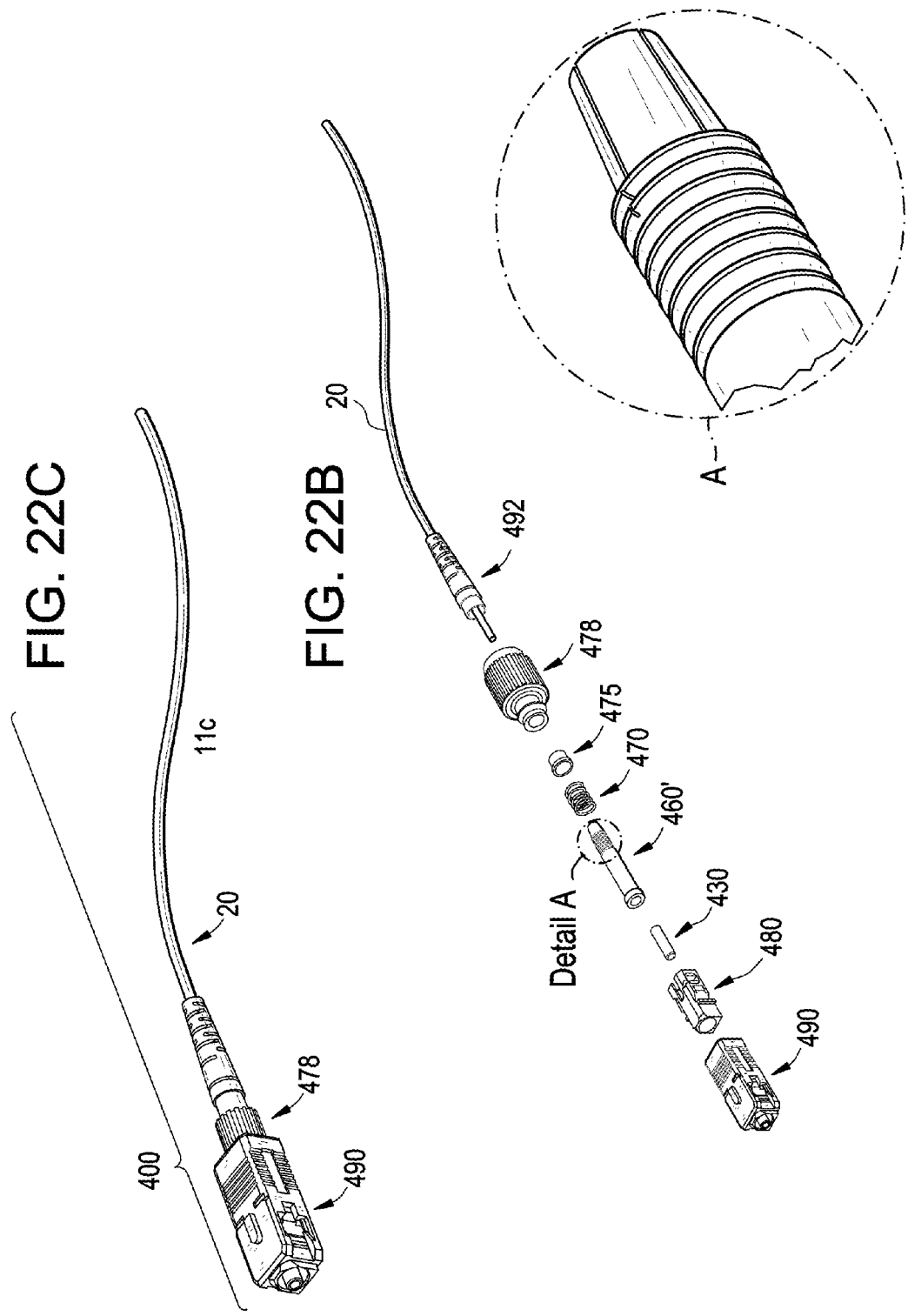

FIBER OPTIC CONNECTORS AND FERRULES AND METHODS FOR USING THE SAME

CROSS-REFERENCE

This application claims the benefit of priority under 35 U.S.C. §119 of U.S. Provisional Application Ser. No. 61/379,927 filed on Sep. 3, 2010 the content of which is relied upon and incorporated herein by reference in its entirety.

BACKGROUND

1. Field

The disclosure is directed to fiber optic connectors along with other structures and methods for using them. More specifically, the disclosure is directed to fiber optic connectors and other structures suitable for use with large core optical fibers and/or buffered fibers and methods for using these connectors and structures.

2. Technical Background

Optical fiber is increasingly being used for a variety of applications, including but not limited to broadband voice, video, and data transmission. Optical fibers may be formed from different types of materials such as plastic or glass depending on the application. Typically, plastic optical fibers (POF) have been used in short distance optical networks since they are relatively easy to terminate by untrained personnel. However, POF has limitations such as not being suitable for longer distance optical networks because the losses using POF increase dramatically with the transmission distance. On the other hand, glass optical fiber has extremely wide bandwidth and low noise operation with relatively low-losses over long distances. However, terminating or connectorizing conventional glass optical fibers is more complicated than terminating POF because it usually requires special cleaving tools and/or stripping tools for preparing the optical fibers. Moreover, conventional terminations or splicing of glass optical fibers may require a skilled technician and/or specialized equipment. For instance, fiber optic connectors for conventional glass optical fibers typically have a fine polish on the end face of the ferrule holding the glass optical fiber that is best accomplished in a factory setting with dedicated equipment. Field-terminated optical fiber connectors having a mechanical splice are available to the craft but are not typically used for short distance optical networks even though they are suitable for these applications.

Thus, there is an unresolved a need for a fiber optic connectors and other structures for use with glass optical fibers that are simple, cost-effective, reliable, easy to assemble, and which offers easy connection and disconnection for short distance optical fiber networks.

SUMMARY

Embodiments of the disclosure are directed to fiber optic ferrules, connectors, and other structures that can be easily and quickly prepared by the craft for termination and/or connectorization in the field. Methods of making the fiber optic connectors and other structures are also disclosed. The methods disclosed allow cutting of the optical fibers with a buffer layer thereon with ordinary blades such as a razor blade.

According to at least one exemplary embodiment a ferrule, comprises: (i) a bore extending from a rear of the ferrule to a front of the ferrule, wherein the bore is sized to receive an optical fiber and a buffer layer at one end face of the ferrule; and (ii) an end stop sized to engage the buffer layer and to contain the optical fiber within said ferrule. According to at least some embodiments the ferrule includes an optical fiber situated within the bore, wherein (i) the end stop is in contact with said buffer layer and aligns said fiber with front face of ferrule. In some embodiments the ferrule includes an optical fiber situated within the bore, wherein (i) the end stop is in contact with said buffer layer and (ii) the end face of the optical fiber is aligned to the other end face of said ferrule such that the distance between the end face of said optical fiber and the other end face of said ferrule is less than 0.005".

According to at least one exemplary embodiment, an fiber optic connector comprises:
a housing sized to receive a ferule; and
a ferrule situated within said housing, said ferrule having a bore, the bore extending from a rear of the ferrule to a front of the ferrule, wherein the bore is sized to receive and guide an optical fiber and a buffer layer to a front end face of the ferrule; and
end stop sized to engage the buffer layer and to contain the optical fiber within said ferrule.

According to at least one exemplary embodiment a method for making a fiber optic connector assembly comprises the steps of:
(i) providing a ferrule having a bore therethrough and a front end face and an end stop situated adjacent to said front end face;
(ii) providing an optical fiber having a core and a protective layer; and
inserting the optical fiber into the bore of the ferrule so that (a) the core and the protective layer extend to the front end face of the ferrule, and (b) the protective layer is in contact with said end stop. In at least some of the embodiments method does not include one or more of the following: polishing of fiber end surface, stripping of any coatings; curing of adhesive(s).

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 18-22A depict explanatory steps for attaching the "rough cut" optical fiber having the buffer layer to the fiber optic connector of FIG. 13;

FIG. 22B depicts another embodiment of the fiber optic connector; and

FIGS. 22C and 22D depicts the fiber optic connector of FIG. 22B.

DETAILED DESCRIPTION OF THE PREFERRED EMBODIMENTS

Reference will now be made in detail to the preferred embodiments of the disclosure, examples of which are illustrated in the accompanying drawings. Whenever possible, like reference numbers will be used to refer to like components or parts.

The embodiments and methods described herein are suitable for making optical connections for short distance optical networks. The concepts of the disclosure advantageously allow the simple, quick, and economical connection and disconnection of glass optical fibers. Reference will now be made in detail to the preferred embodiments, examples of which are illustrated in the accompanying drawings. Whenever possible, like reference numbers will be used to refer to like components or parts.

Figure 1:
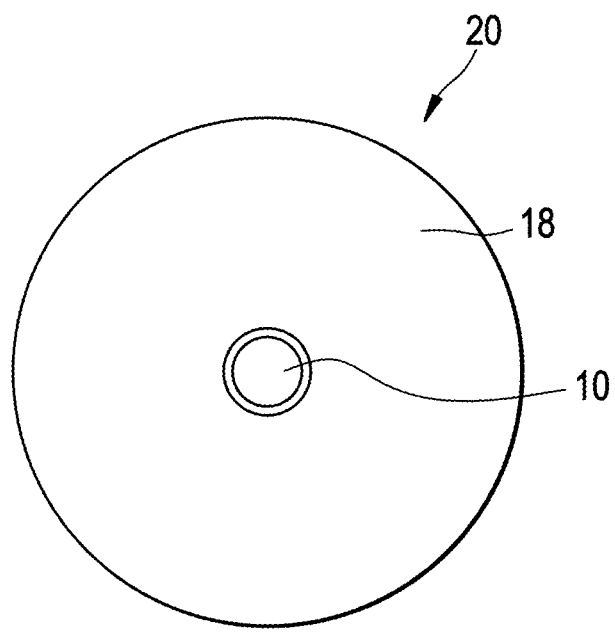
FIG. 1 is an end view of a large core optical fiber having a buffer layer after being "rough cut" for use in the fiber optic connectors disclosed herein.

FIG. 1 is an end view of an optical fiber 10 having a buffer layer 18 forming an optical fiber/buffer layer assembly 20 after being "rough cut" for use in the fiber optic connectors or other structures disclosed herein. Optical fiber 10 has a large glass core with a thin cladding layer such as, for example, plastic cladding layer which is then protected with a protective coating as described in more detail herein. Alternatively, the cladding layer may be made of glass. Stated another way, optical fiber 10 of this embodiment is a glass-based optical fiber such as a silica-based optical fiber. As used herein, "a large glass core" means the optical fiber has a core with a diameter of 80 microns or greater. Using optical fibers with large glass (or plastic) core aids in the alignment of the abutting optical fiber cores. In this embodiment, optical fiber 10 has a core with a diameter of about 200 microns and cladding that is about 15 microns. The protective coating of optical fiber 10 generally covers the cladding and is also relatively thin such as about 10 microns. A polyvinylchloride (PVC) buffer layer 18 upcoats the exemplary optical fiber 10 to 1.5 millimeters, but other suitable materials and/or dimension are possible for the buffer layer. Moreover, optical fiber 10 preferably has a concentricity error with buffer layer 18 that is 20 microns or less. The construction of optical fiber 10 with buffer layer 18 is advantageous for short distance optical fiber networks or other applications due to the simplicity in preparing the same for connectorization. By way of example, special cleaving tools and/or stripping tools are not required for preparing optical fiber 10. Instead, optical fiber 10 and buffer layer 18 can be "rough cut" in a single step using a common razor blade. By way of example, the protective coating inhibits the core of optical fiber 10 from being pushed off center during the cutting process with a simple tool such as a utility blade. Simply stated, the construction of the coating helps maintain the concentricity of optical fiber 10 with respect to buffer layer 18, thereby allowing a low-loss optical connection. Thus, preferably, the buffer layer remains on fiber during and after cutting, and does not need to be stripped.

Figure 2:
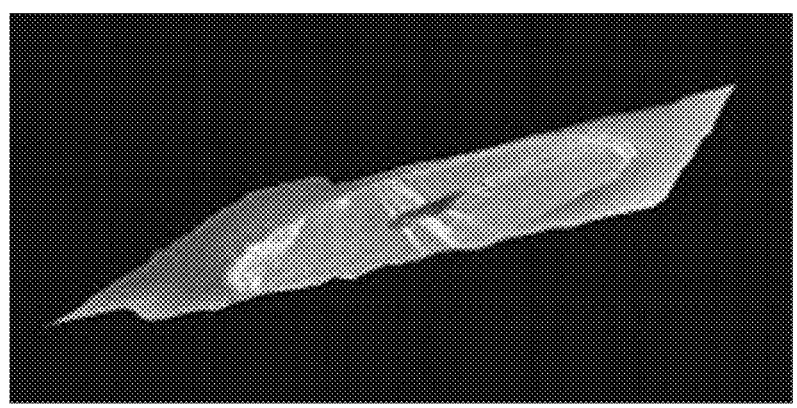
FIG. 2 is a contour representation of a "rough cut" optical fiber.
Figure 3A:
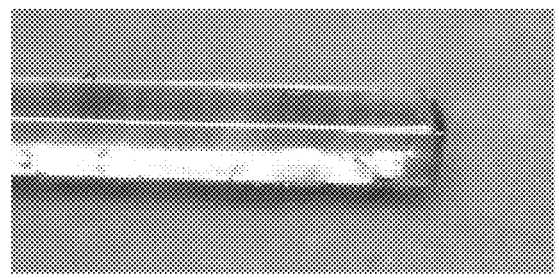
FIGS. 3A and 3B depicts a comparison between an optical fiber "rough cut" with a buffer layer disposed at the cut portion and an optical fiber "rough cut" without a buffer layer disposed at the cut portion.
Figure 3B:
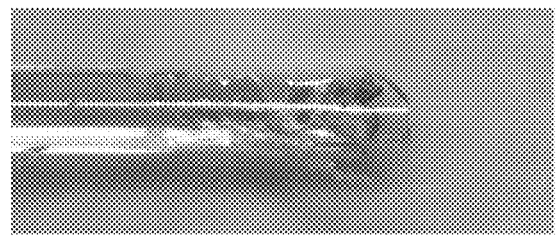

FIG. 2 shows a contour representation of "rough cut" optical fiber 10 using a Keyence microscope with surface profile capacity. Optical fiber 10 was cleaved using a common utility blade as opposed to a precision cleaver as would be used when terminating an optical fiber used in typical telecommunication optical network. The surface of optical fiber 10 is multi-faceted as shown; however, it is not shattered. The construction of optical fiber 10 with buffer layer 18 allows "rough cutting." By way of example, FIG. 3 depicts a comparison between optical fiber 10 "rough cut" with buffer 18 thereon (picture A) and the optical fiber "rough cut" after the buffer layer was removed (picture B). Both optical fibers were "rough cut" with respective brand new utility blades. Buffer layer 18 has been removed from optical fiber 10 in picture A so the condition of optical fiber 10 thereunder can be viewed for comparison purposes with picture B. Specifically, picture A shows that optical fiber 10 is in relatively pristine condition compared with the optical fiber in picture B after "rough cutting". In other words, the optical fiber in picture B has more damage than the optical fiber 10 cut with the buffer layer 18 as shown in picture A. Fiber optic connectors and other structures disclosed herein use the rough cut optical fibers with the buffer layer 18 intact at the front end face of the optical fiber.

Simply stated, special tools and procedures are not required for connectorizing and/or splicing the rough cut optical fibers. Furthermore, the structures disclosed herein are also advantageous since they allow the use of high-quality glass optical fiber without requiring polishing to a fine finish as typically done for glass optical fibers having small optical fiber cores; however, the "rough cut" end face the optical fiber/buffer layer may be smoothed if desired. Consequently, an untrained person can quickly and easily make connections of suitable quality for optical networks while advantageously using glass optical fibers, instead, of using plastic optical fibers.

Figure 4:
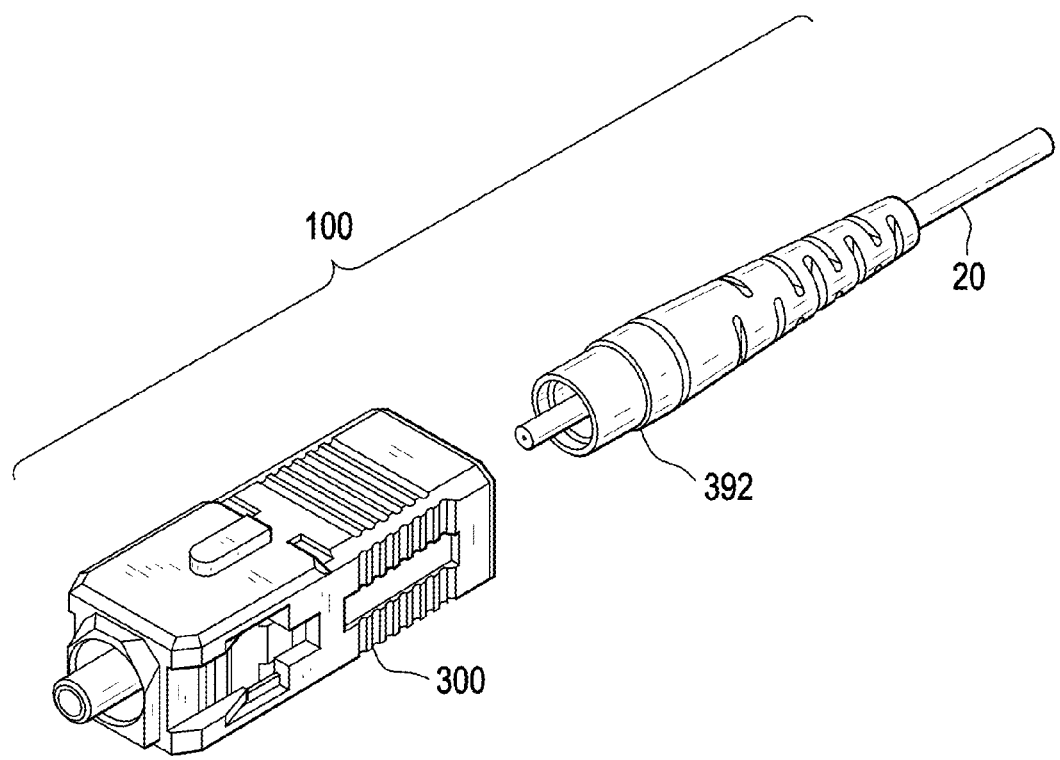
FIGS. 4-6 depict various views of a fiber optic connector having the optical fiber of FIG. 1 where the ferrule of the connector has a bore sized to receive the optical fiber and the buffer layer at a front end face of the ferrule.
Figure 5:
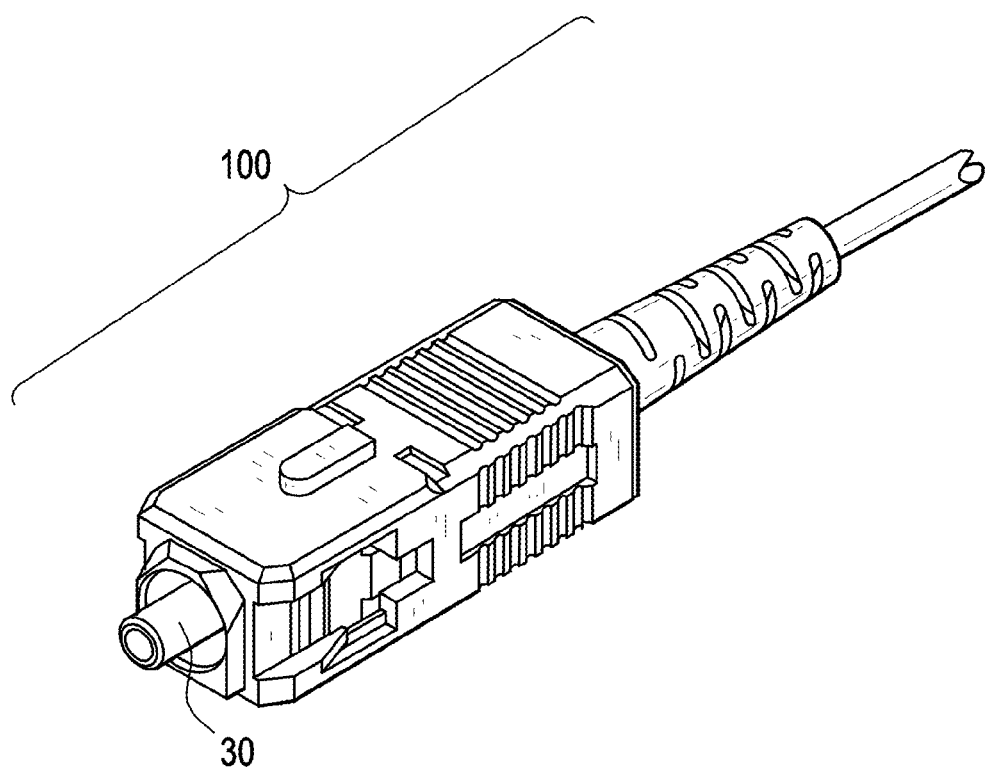
Figure 6:
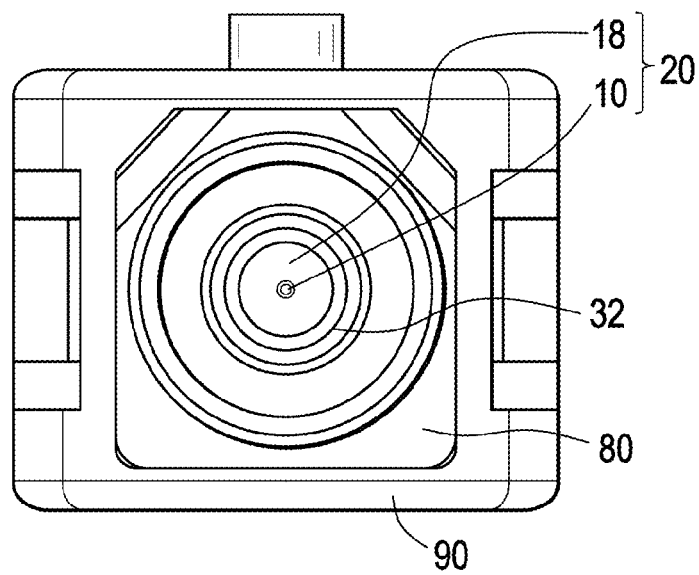

FIGS. 4-6 depict various views of a fiber optic connector 100. FIG. 4 shows a partially assembled view of fiber optic connector 100 and FIG. 5 shows an assembled fiber optic connector 100. Fiber optic connector 100 includes a ferrule 30 having a bore 31 sized to receive the optical fiber 10 with the buffer layer 18 at a front end face 32 of the ferrule 30 as best shown in FIG. 6. In other words, ferrule 30 has a bore (preferably with a tapered lip) that extends from a rear of the ferrule to a front (i.e., the front end face) of the ferrule 30 where the bore is sized to receive the rough cut optical fiber 10 with the buffer layer 18 at the front end face 32 of the ferrule 30. The bore 31 of the exemplary ferrule 30 has a diameter of 125-250 microns (or greater) near or at the front end face 32, but ferrules can have any suitable sized bore that is matched to the outer diameter of the buffer layer surrounding the optical fiber. Illustratively, the bore of ferrule 30 has a diameter slightly larger than 1.5 millimeters for receiving optical fiber 10 and buffer layer 18 having the outer diameter of 1.5 millimeters at the front end face 32 for abutting with another optical fiber. By way of example, other suitable bore sizes at the front end face 32 are 115 microns, 130 microns, 150 microns, 200 microns, 250 microns, 300 microns, 900 microns, 700 microns, 500 microns, but other sizes matched to the outer diameter of the buffer layer are possible.

Fiber optic connector 100 may include other suitable components. Illustratively, FIG. 6 depicts an end view of fiber optic connector 100 showing an outer housing 90 for aligning and/or latching the same and an inner housing 80 that cooperates with the outer housing 90. Further, fiber optic connectors may include one or more retaining structures for securing the optical fiber to the fiber optic connector. Preferably the retaining structure does not require the use of adhesives. In this embodiment, the optical fiber/buffer layer is secured with a crimp structure on the buffer layer 18, but other retaining structures are possible. Examples of other suitable retaining structures include a camming feature or other suitable structure for securing the optical fiber to the fiber optic connector. In still further embodiments, the retaining structure may be reversible, that is, the retention may be undone in case the optical fiber requires repositioning. For instance, the cam feature may be reversed to unclamp the optical fiber for repositioning the same within the fiber optic connector.

In some embodiments, if the end of the optical fiber 10 with the buffer layer 18 thereon is not flush (within +/− about 200 um) with the front end face 32 of the ferrule 30, the ferrule the insertion loss (e.g., between mated fibers) can be higher than desirable for some applications. Thus, according to some embodiments, the ferrule 30 contains end stop 33 (e.g., tapered end stop 33A, or lip 33B) adjacent to the front end face 32. This end stop 33 (e.g., tapered end stop 33A, or lip 33B) at the end of the ferrule 30 facilitates alignment of the end of the buffered fiber with the end face 32 of the ferrule 30. The tapered nature of the tapered end stop 33A, or the rounded taper of lip 33B (FIG. 7D) can also help to center undersized layer 18 within the ferrule 30, thereby minimizing the insertion losses. More specifically, the end stop or lip 33 at the end of the ferrule 30 may provide one or more of the following advantages: (i) it reduces opportunity for operator error causing high insertion loss, (ii) it works with multiple buffer types (e.g., different materials such as PVC or low smoke zero halogen buffer material), (iii) it helps to center an undersized buffered fiber (i.e., the fiber with buffer diameter that is smaller than the bore diameter of the ferrule) within the ferrule, while not adding any significant amount to the manufacturing cost of the ferrule.

According to at least some embodiments, a ferrule comprises a bore extending from a rear of the ferrule to a front of the ferrule, wherein the bore is sized to receive an optical fiber and a buffer layer at one end face of the ferrule; and end stop sized to engage the buffer layer and to contain the optical fiber within said ferrule. The ferule may also include contain an optical fiber situated within the bore, wherein (i) said end stop is in contact with said buffer layer and (ii) the end face of said optical fiber is aligned to the other end face of said ferrule such that the distance between the end face of said optical fiber and the other end face of said ferrule is less than 0.005". Preferably, the distance between the end face of said optical fiber and the other end face of said ferrule is not greater than 0.002", more preferably less than 0.001", even more preferably less than 0.0005". Preferably the end stop includes a taper or a lip for engaging the buffer layer of the optical fiber. Preferably, the largest diameter of the bore is larger than the smallest inner diameter of the taper or lip.

Figure 7A:
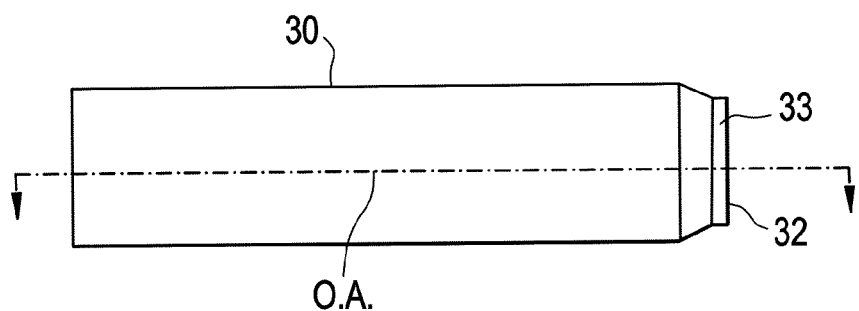
FIG. 7A illustrates schematically a side view of a ferrule according to one embodiment of the present invention.
Figure 7B:
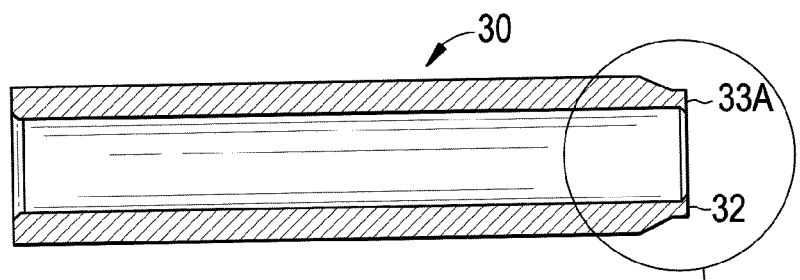
FIG. 7B illustrates schematically a cross-sectional side view of the ferrule of FIG. 7A.
Figure 7C:
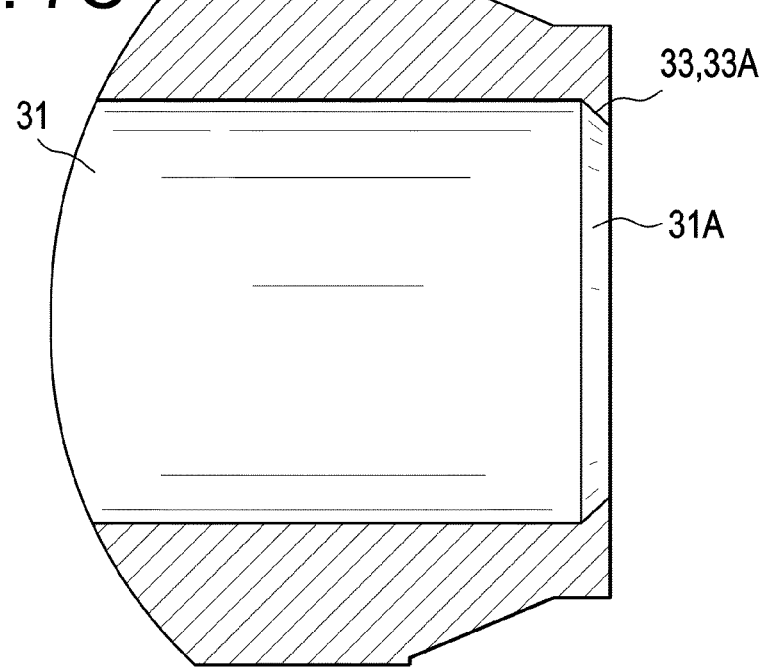
FIGS. 7C and 7D illustrates an enlarged portion of the Ferrule, such as the one depicted in FIG. 7B.
Figure 7D:
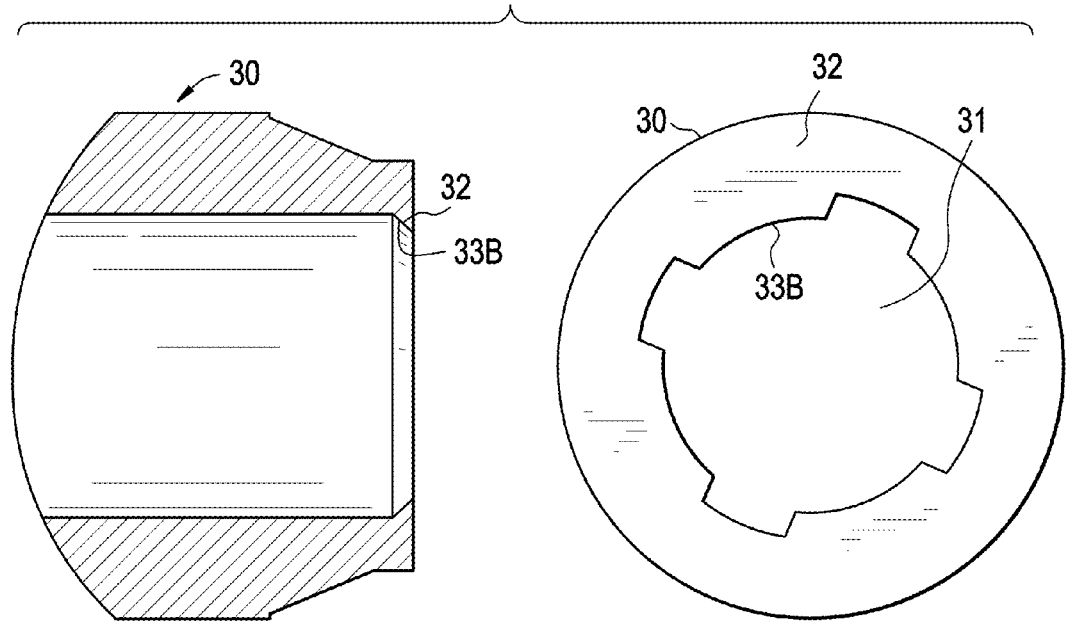

FIG. 7A illustrates schematically a ferrule 30 with end stop 33. FIG. 7B shows a cross-section of the ferrule of FIG. 7A contains a tapered end stop 33A adjacent to the front end face 32. Alternatively the end stop may be a rounded lip 33A. FIG. 7C provides an expanded view of area G shown in FIG. 7B. More specifically, FIGS. 7B and 7C illustrate that in this embodiment the bore 31 includes the end stop chamfer 31A formed by the tapered bore wall or lip 33A. In this embodiment the end stop 33 is formed by the tapered surface of the bore 31. The bore 31 extends from a rear of the ferrule 31 to the front end face 32 of the ferrule 30, and the bore and the end stop are sized to receive the rough cut optical fiber 10 with the buffer layer 18. More specifically, in this embodiment the optical fiber 10 with the buffer layer 18 is inserted from the rear end of the ferrule 30, through the bore 31, until it comes in contact with the end stop 33. In this embodiment the end stop chamfer has a 45 degree angle with respect to the bore of the ferrule and a height h of approximately 100 microns. Other heights may also be utilized (e.g., 5 μm-300 μm, for example: 5 μm, 10 μm, 15 μm, 20 μm, 25 μm, 30 μm, 40 μm, 50 μm, 60 μm, 75 μm, 125 μm, 150 μm, 200 μm, or 250 μm). It is noted that a small sized bore would preferably have an end stop of a smaller height. For example, a ferrule with a 125 μm diameter bore may have an end stop that is 5-20 μm high. Also, if the tolerance on the outer size of the buffer layer is tight (e.g., buffer diameter controlled to ±5 μm or smaller deviation), a smaller stop size can be utilized, because bore size will be closer to the size of the buffered fiber. In this embodiment the material used for the buffer layer 18 is softer than the material used to make the ferrule. In this embodiment the ferrule is molded from plastic, preferably engineering theroplastics, examples being Polyethersulfone, polyetherimide or polyphenylsulfone, and the material used for the buffer layer 18 is softer than the plastic material used to mold the ferrule 30. When the buffer layer 18 contacts the end stop 33, it will deform and allow the optical fiber to advance towards the front end face 32 of the ferrule 30. For a range of forces consistent with hand assembly, the fiber end face will become approximately in alignment with the end face of the ferrule. It is noted that the end stop 33 may be optionally present in other embodiments of the ferrules described and shown herein. In addition, the ferrule with the end stop 33 may be formed as an integral part of a connector and does not have to be a separate part inserted into the connector. It is also noted that the outer surface of the ferrule does not have to be round or cylindrical. It is also noted that the end stop does not need to be continuous—i.e., it does not have to provide a continuous diameter to engage the buffer layer 18. For example it may be formed by 2, 3 or more sections tapered sections (see, for example, FIG. 7D) with a dimension that is slightly smaller than the size of the bore.

Figure 8:
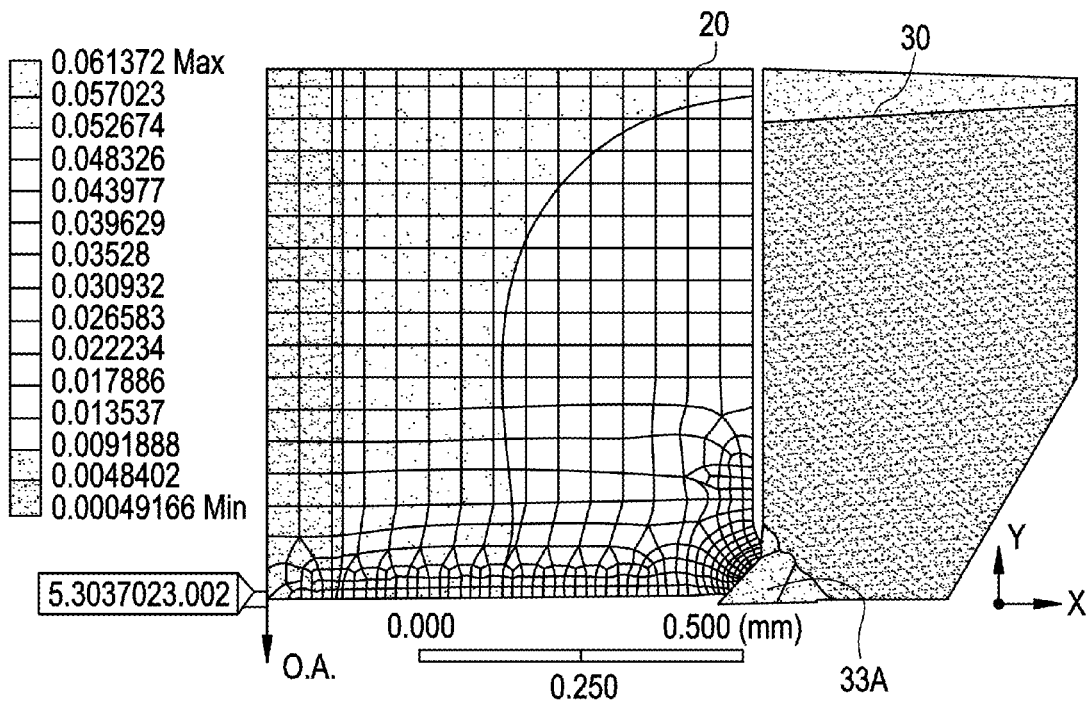
FIG. 8 illustrates the result of fine element analysis (FEA) and shows deformation of the buffer layer near the end stop chamfer illustrated in FIG. 7C.

FIG. 8 illustrates Finite Element Analysis (FEA) of effectiveness of end stop chamfer 33 of FIGS. 7A-7C. More specifically, it illustrates a buffered fiber with an optical axis OA aligned along the Y axis of FIG. 8. Because the fiber and the ferrule 30 used for the FEA are symmetrical around the optical axis of the fiber, FIG. 8 illustrates only one half of the fiber and the adjacent portion of the ferule 30. The right hand side figure illustrates the ferule with the end stop 33 and the left hand side of this figure shows the buffered fiber. The buffered fiber is inserted from the top, until the buffer layer 18 comes into the contact with the end stop 33 of the ferule 30. The system is symmetric and so the left hand side of the fiber and the ferrule is not shown. A force is applied to the buffered fiber as it comes in contact with the end stop 33, and the resulting deformation of the components is calculated. FIG. 8 illustrates the function of the end stop chamfer 31A. When forces consistent with hand assembly are applied to the buffered fiber, the buffer 18 contacts the end stop 33 as shown in FIG. 8, and deforms to the extent that the endface of the fiber 10 approximately aligns with the front end face 32 of the ferrule 30. FIG. 8 illustrates that most of the deformation is confined to the edge of the buffer layer 18 adjacent to the end stop 33, and that there is no substantial deformation near the center of the fiber.

Figure 9:
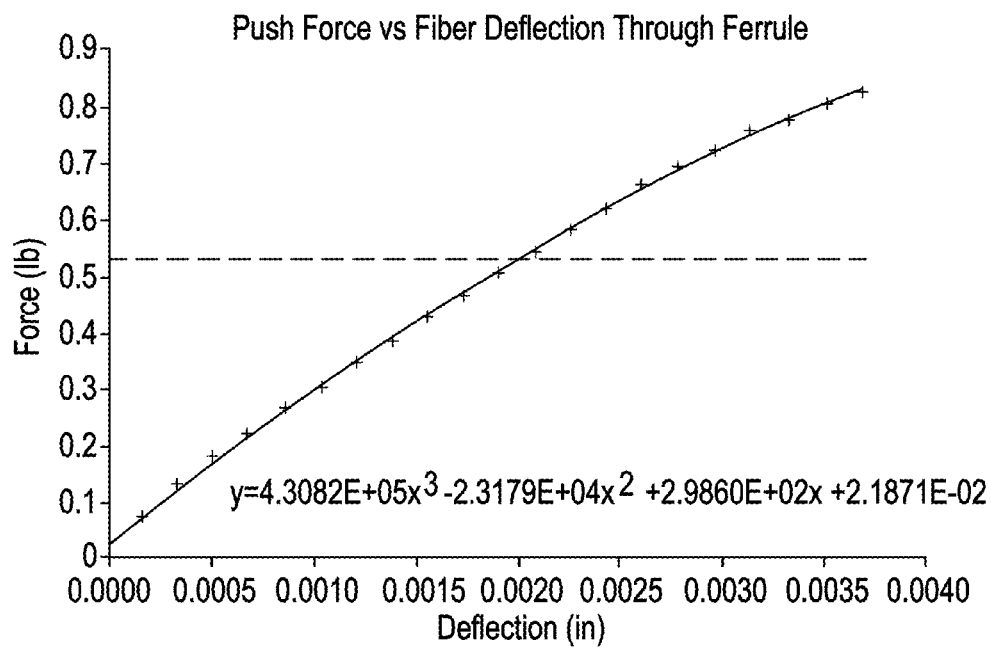
FIG. 9 is a plot of force applied to the buffered fiber vs. spacing between the end face of the ferrule and the end face of the buffered fiber situated inside the ferrule of FIGS. 7A-7C.

FIG. 9 is a plot of force applied to the buffered fiber as it comes in contact with the end stop vs. fiber deflection. More specifically, FIG. 9 shows the results of several FEA calculations in a plot of Push force vs. fiber deflection (which corresponds to distance Y between the fiber end face and the end face 32 of the ferrule 30) through ferrule. In this embodiment, alignment of the fiber endface with the end of the ferrule (Y=0.000 mm) corresponds to a deflection of about 0.002" and this occurs at an applied force of just over 0.5 pounds. More specifically, the measurement started when the end face of the buffered fiber was 0.002" (deflection of zero) away from the end 32 of the ferrule 30, and not yet pressing against the end stop 33. This is shown on the left side of FIG. 9 (0 lb applied force, deflection=0.00"). As the fiber is being pushed towards the end face 32, it engages the end stop 33 and more force is applied to align the "rough" cut end face of the optical fiber with the end face 32 of the ferrule 30 by pushing the fiber against the end stop. According to some embodiments, the push force about 0.1 lb to 2 lb (e.g., 0.2-1 lb) corresponds to the total alignment (Y distance is 0) between the fiber end face and the end face 32 of the ferrule 30. In this embodiment, the push force of about 0.53 lb corresponds to the total alignment (no distance) between the fiber end face and the end face 32 of the ferrule 30 (distance 0.002" from the initial deflection position of 0.000") corresponds to the total alignment (no distance) between the fiber end face and the end face 32 of the ferrule 30. FIG. 9 also shows that a somewhat larger force (between 0.55 lb and 0.8 lb) does not push the fiber through the ferrule. FIG. 9 also illustrates that alignment of less than ±0.001" occurs over the range of push forces that are 0.3 pounds thru 0.7 pounds and that the alignment of less than ±0.002" is produced by a push force in a range of about 0.05 pounds through 0.9 pounds. Due to the symmetrical design, the end stop chamfer 31 also centers an undersized buffered fiber when the buffer comes in contact to the end stop.

Figure 10:
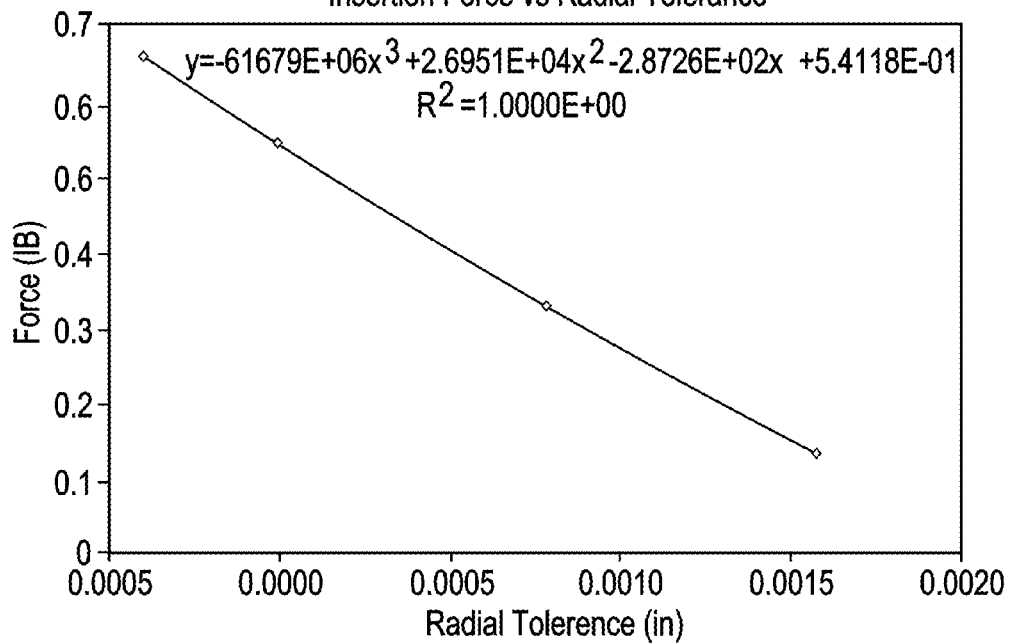
FIG. 10 is a plot of radial gap between the buffer layer wall and the bore of the ferrule vs. applied force used to center the buffered fiber within the ferrule and to align the end face of the fiber with the end face of the ferrule.

FIG. 10 illustrates the push force required to align the fiber end face with the front face 32 of the ferrule vs. the radial gap between the external side of the buffer layer 18 and the ferrule's bore. It illustrates that the when the buffer outer diameter was equal to the bore diameter, total alignment between the fiber end face and the end face 32 resulted by applying the push force (0.53 lb) when pushing the fiber buffer against the end stop 33. FIG. 10 also illustrates that a fiber that has a buffer layer with somewhat smaller diameter will require less force to center the fiber within the bore, and to align the fiber end face with the end face 32 (i.e. such that distance Y=0 mm).

Figure 11:
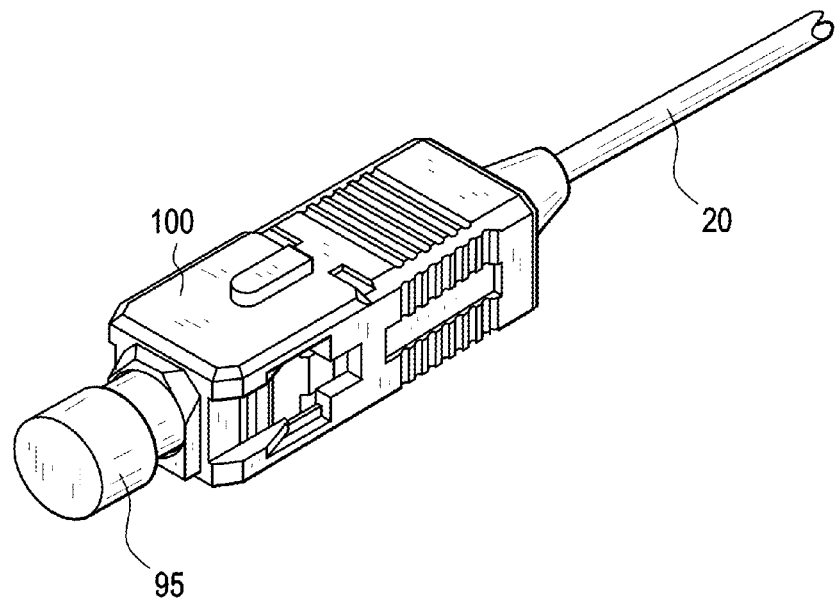
FIG. 11 depicts a fiber optic connector having a dust cap.

Of course, fiber optic connectors can have other components and/or features. FIG. 11 depicts a fiber optic connector having a dust cap 95 attached to the same. Dust cap 95 may act as a stop for optical fiber insertion. In other words, during assembly dust cap 95 remains attached to ferrule 30 and the optical fiber/buffer layer is inserted until it abuts the dust cap 95 indicating that it inserted to the correct position. The lip or taper within the bore of the ferrule 30 can prevent the dust cup 95 from being pushed off by the buffered fiber, by keeping the front face of the fiber aligned with the front end surface 32. In further embodiments, dust cap 95 may be preloaded with an index-matching gel within the same so that when the optical fiber 10 abuts the same index-matching gel is applied to an end face of the optical fiber. Other suitable components include boots, springs, etc. Likewise, the concepts disclosed may be used with fiber optic connectors having any suitable configuration such as SC, FC, ST, LC or the like and the concepts may be used with multifiber connectors also.

Figure 12:
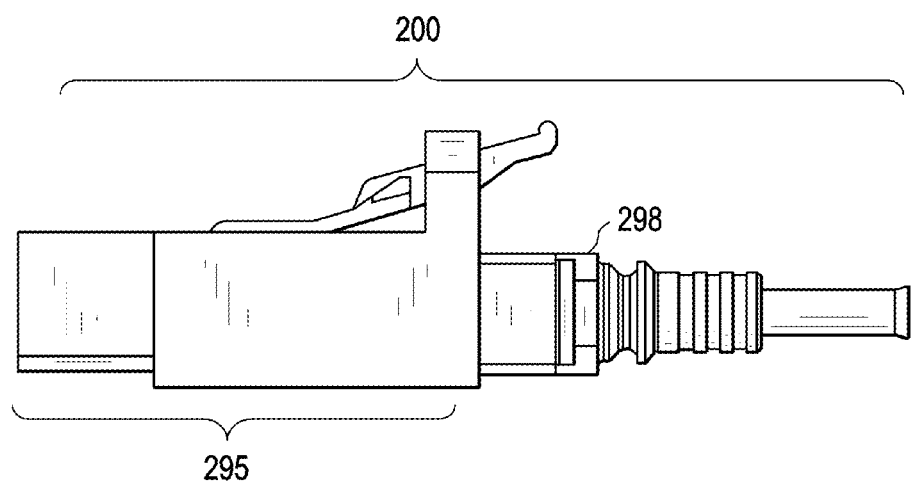
FIG. 12 depicts another embodiment of fiber optic connector.

FIG. 12 depicts a fiber optic connector 200 suitable for connectorizing a large core optical fiber with a rough cut as discussed above, except fiber optic connector 200 does not require a ferrule for holding and centering the optical fiber/buffer layer. Instead, a body of fiber optic connector 200 has a portion with a retaining structure for securing an optical fiber and a front portion having a passageway sized to receive the optical fiber and buffer layer through a front end of the body. Thus, fiber optic connector 200 allows the optical fiber/buffer layer to extend to a mating front face of fiber optic connector 200. Additionally, fiber optic connector 200 can include other suitable components and/or such as a dust cap, index-matching gel, one or more housings, springs, etc.

For instance, fiber optic connector 200 includes a dust cap 295 attached to the same. Dust cap 295 may act as a stop for optical fiber/buffer layer assembly 20 insertion as discussed. Further, dust cap 295 may be preloaded with an index-matching gel so that when the optical fiber 10 abuts the same index-matching gel is applied to an end face of the same. The dust cap 295 may be secured to fiber optic connector 200 using a cantilever latch 298. Consequently, when inserting the optical fiber/buffer layer assembly 20 to the proper location abutting the dust cap 295, the dust cap 295 is inhibited from being unintentionally displaced.

Figure 13:
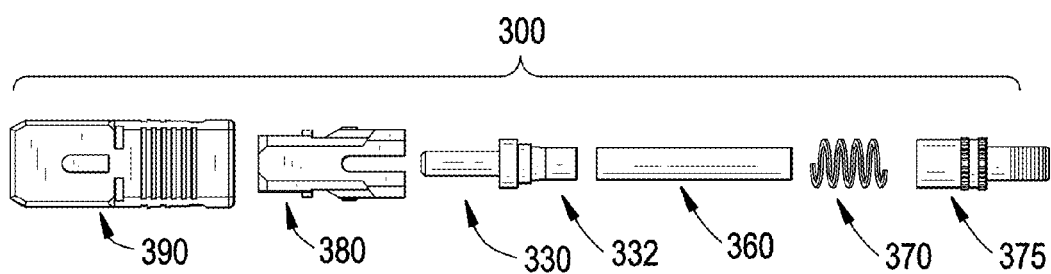
FIG. 13 depicts a partially exploded view of another fiber optic connector.
Figure 14:
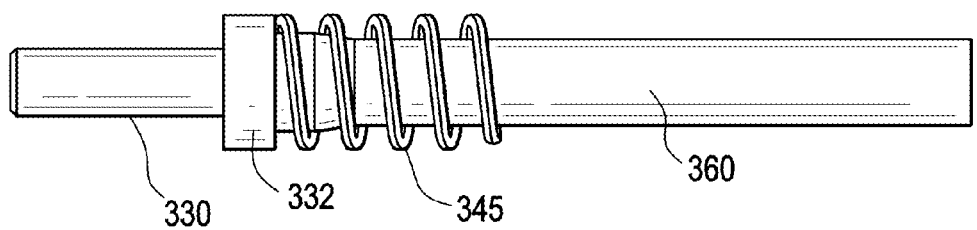
FIGS. 14-17 depict explanatory steps for assembling the components of the fiber optic connector of FIG. 13.
Figure 15:
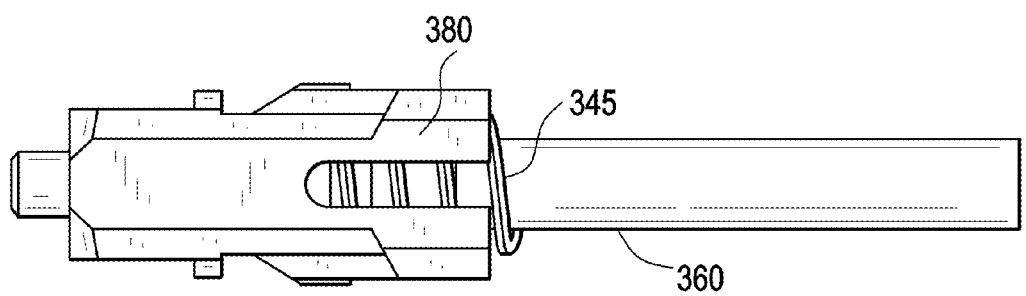
Figure 16:
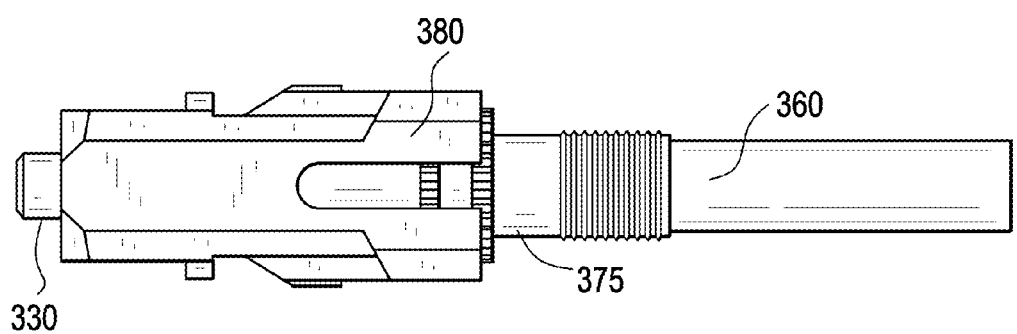
Figure 17:
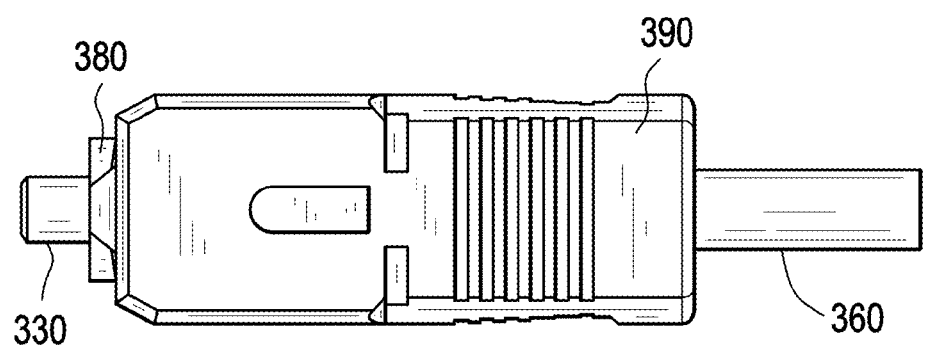

FIG. 13 depicts a partially exploded view of an exemplary SC fiber optic connector 300 using the disclosed concepts. As shown, fiber optic connector 300 includes a ferrule 330, a ferrule holder 332, a crimp body 360, a spring 370, a spring push 375, an inner housing 380, and an outer housing 390. Ferrule 330 has a bore sized to receive optical fiber/buffer layer assembly 20 at its front end face. Likewise the ferrule holder 332 has a bore sized to receive crimp body 360 therethrough. In this embodiment, crimp body 360 has a bore sized to receive optical fiber/buffer layer assembly 20 such as about 1.5 millimeters, but the bore may have other suitable sizes for receiving the same. The assembly of these components of fiber optic connector 300 is illustrated in FIGS. 14-17. More specifically, FIG. 14 shows ferrule 330 attached to ferrule holder 332 with crimp body 360 retained within the ferrule holder 332 and the spring 345 slid over the sub-assembly. Next, the sub-assembly of FIG. 14 is inserted into inner housing 380 as shown in FIG. 15 and then spring push 375 is slid over crimp body 360 to engage the rear portion of inner housing 380 until it is fully seated as shown in FIG. 16. Thereafter, outer housing 390 is attached over a portion of the inner housing 380 as shown in FIG. 17 and a dust cap with or without an index-matching gel may be secured to ferrule 330 if desired. The fiber optic connector assembly is ready for attaching the optical fiber/buffer layer assembly thereto.

Figure 18:
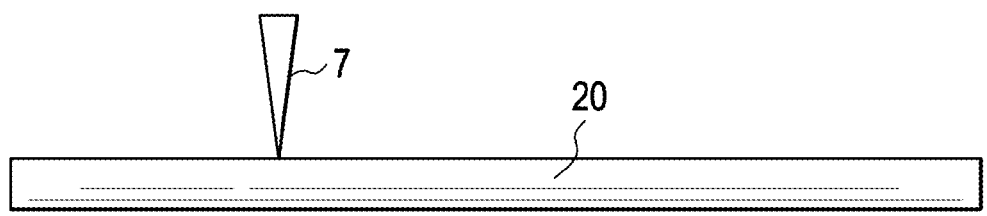
Figure 19:
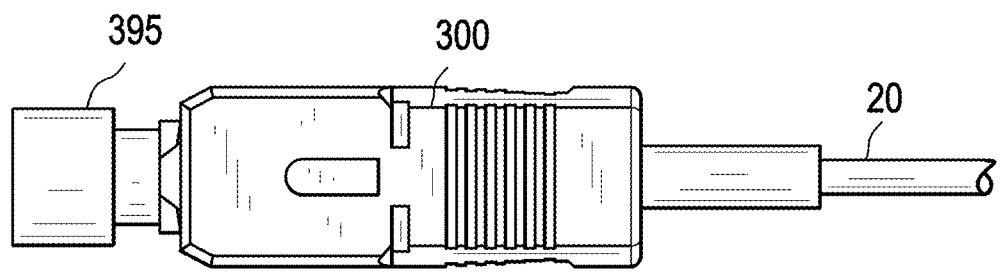

FIGS. 18-22A depict explanatory steps for attaching a "rough cut" optical fiber/buffer layer assembly 20 to the sub-assembly of FIG. 17. FIG. 18 is a schematic representation of optical fiber/buffer layer assembly 20 being "rough cut" with a utility blade. "Rough cutting" of the optical fiber/buffer layer assembly 20 may be accomplished by merely pushing a blade 7 down and through the assembly in a suitable fashion and does not require any special tools. Thereafter, the "rough cut" optical fiber/buffer layer assembly 20 is inserted into the assembled fiber optic connector 300. As shown, in FIG. 19, the optical fiber/buffer layer assembly 20 is inserted until it abuts a dust cap 395. In this embodiment, dust cap 395 has a reservoir that includes an index-matching gel (not visible) therein, thereby applying the index-matching gel to the end face of the optical fiber/buffer layer assembly 20. Thereafter, the optical fiber/buffer layer assembly 20 is secured to the fiber optic connector.

Figure 20:
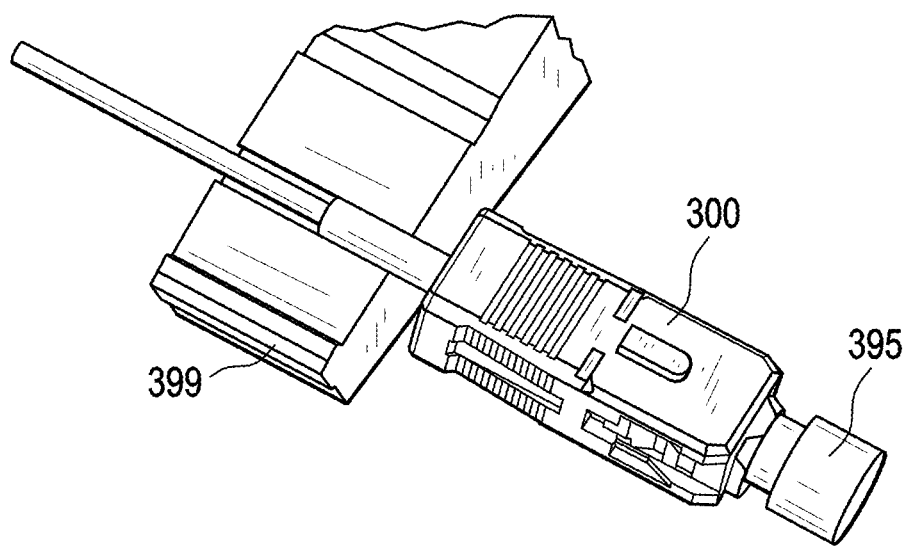
Figure 21:
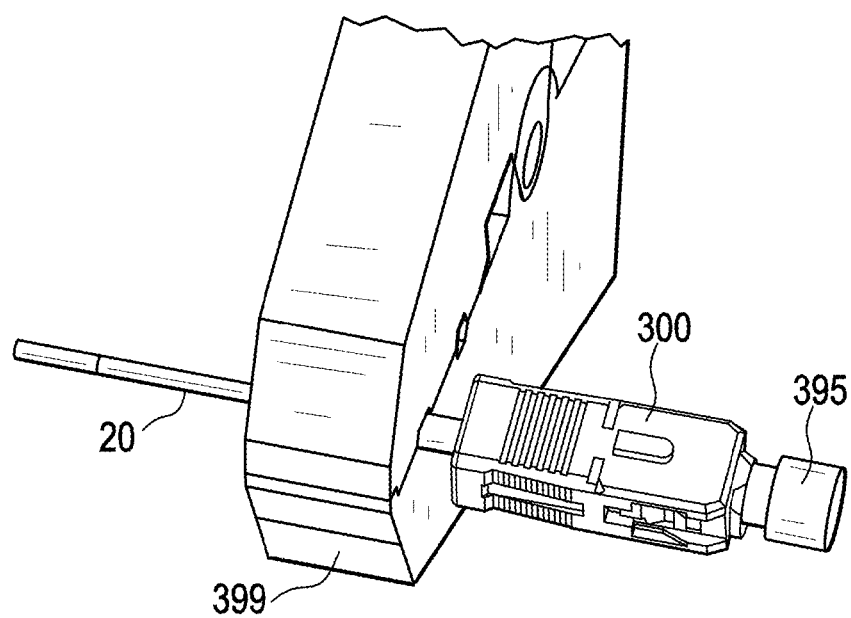

FIGS. 20 and 21 depict optical fiber/buffer layer assembly 20 being secured to fiber optic connector 300 using a crimp tool 399. FIG. 20 shows fiber optic connector 300 with optical fiber/buffer layer assembly 20 inserted therein is placed into the jaw of crimp tool 399. Thereafter, crimp tool 399 is actuated to deform crimp body 360 about the buffer layer 18, thereby securing optical fiber/buffer layer assembly 20 to fiber optic connector 300. Then the fiber optic connector 300 is removed from crimp tool 399 and a boot 392 that was previously threaded onto optical fiber/buffer layer assembly 20 may be slid onto the rear portion of fiber optic connector 300, thereby forming the assembly shown in FIG. 22A. Although this embodiment uses a crimp tool 399 for securing optical fiber/buffer layer assembly 20 to fiber optic connector 300 other embodiments with different retention structures may not require a crimp tool for securing the same. For instance, the retention structure could use a threaded compression nut for biasing one or more cantilever arm together to clamp the optical fiber/buffer layer assembly 20. Other embodiments may use a cam structure that secures the optical fiber/buffer layer assembly 20 by rotating the cam.

Figure 22A:
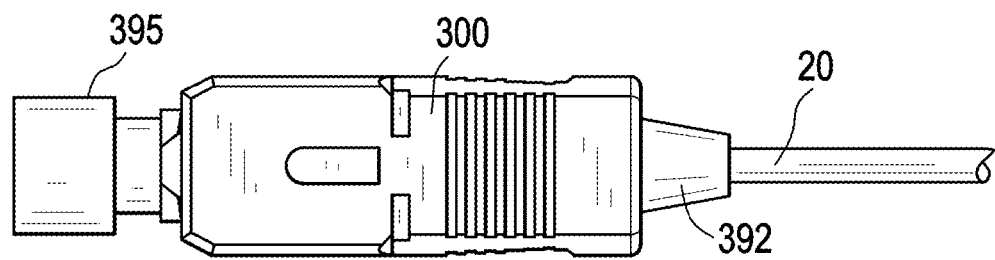
Figure 22D:
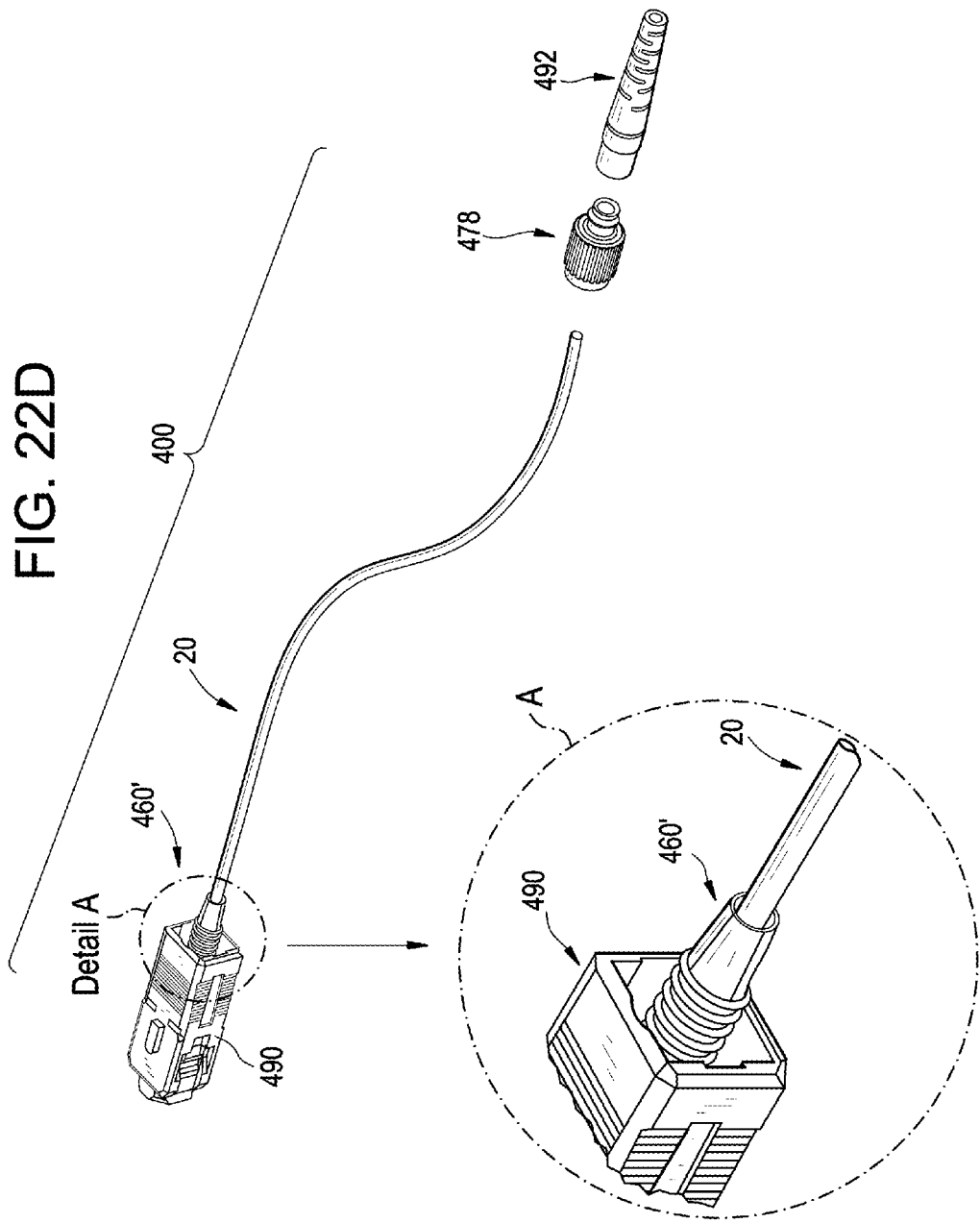

One embodiment of the fiber optics connector retention structure that utilizes a threaded compression nut for biasing one or more cantilever arm together to clamp the optical fiber/buffer layer assembly 20 is shown, for example in FIGS. 22B-D. More specifically, FIG. 22C illustrates the assembled connector FIG. 22B depicts a partially exploded view of an explanatory SC fiber optic connector 400. As shown, fiber optic connector 400 includes a ferrule 430, a combined ferrule holder and cantilever arm structure 460', a threaded compression nut 478, a spring 470, a spring push 475, an inner housing 480, and an outer housing 490. Ferrule 430 has a bore sized to receive optical fiber/buffer layer assembly 20 at its front end face. In this embodiment, cantilever arm structure 460' has at least one bore 460'A sized to receive optical fiber/buffer layer assembly 20 such as about 1.5 millimeters, but the bore may have other suitable sizes for receiving the same. The assembly of these components of fiber optic connector 400 is illustrated in FIG. 22D. Ferrule 430 is attached to cantilever arm structure 460' and the spring 445 slid over the sub-assembly. Next, the sub-assembly is inserted into inner housing 480 and then spring push 475 is slid over crimp body 460 to engage the rear portion of inner housing 480 until it is fully seated. Thereafter, outer housing 490 is attached over a portion of the inner housing 480 and a dust cap with or without an index-matching gel may be secured to ferrule 430 if desired. a threaded compression nut 478 may also be installed on, cantilever arm structure 460'. The fiber optic connector assembly is ready for attaching the optical fiber/buffer layer assembly 20 thereto. FIGS. 22 C-D depict exemplary steps for attaching a "rough cut" optical fiber/buffer layer assembly 20 to fiber optic connector 400. FIG. 18 is a schematic representation of optical fiber/buffer layer assembly 20 being "rough cut" with a utility blade. "Rough cutting" of the optical fiber/buffer layer assembly 20 may be accomplished by merely pushing a blade 7 down and through the assembly in a suitable fashion and does not require any special tools. Thereafter, the "rough cut" optical fiber/buffer layer assembly 20 is inserted into the assembled fiber optic connector 400. As shown, in FIG. 19, the optical fiber/buffer layer assembly 20 is inserted until it abuts a dust cap 395. In this embodiment, dust cap 395 has a reservoir that includes an index-matching gel (not visible) therein, thereby applying the index-matching gel to the end face of the optical fiber/buffer layer assembly 20. Thereafter, the optical fiber/buffer layer assembly 20 is secured to the fiber optic connector by tightening the threaded compression nut which compresses the cantilever arm structure onto the fiber optic cable 20 to secure fiber optic cable 20.

The methods for making a fiber optic connector assembly may include the steps of providing a ferrule having a bore therethrough and a front end face and providing an optical fiber having a core and a protective layer. "Rough cutting" the optical fiber/buffer layer assembly, if necessary, and then inserting the optical fiber into the bore of the ferrule so that the core and the protective layer extend to the front end face of the ferrule. The method of making the fiber optic assembly may further include the step of abutting the optical fiber to a dust cap that includes an index-matching gel. Likewise, the method may include the step of securing the optical fiber to the connector, securing a boot to the connector, and/or the other steps described herein such as assembling the fiber optic connector. As described herein, preferably, the fiber includes a buffer layer and is cleaved or cut while retaining the buffer layer, and the cleaved or cut fiber is inserted in a connector without stripping the buffer layer. Preferably, the method includes at least one of the following: no polishing of fiber end surface, no stripping of any coatings; no use and/or no curing of adhesive(s). Preferably the cut or cleaved fiber is placed into an optical connector and anther fiber in also placed in the connector, such that the cut or cleaved fiber is optically coupled to the other fiber. Preferably, a quantity (less than 0.5 ml, preferably less than 0.1 ml) of oil or index matching gel described above is placed between the two fibers. Thus, the fibers are not attached to one another by an adhesive. Therefore, the method of making the fiber optic assembly preferably includes: no polishing of fiber end surface, no stripping of any coatings; and no curing of adhesive(s).

Alternative, methods for making a fiber optic connector assembly may includes the steps of providing a body having a portion with a retaining structure and a passageway therethrough; providing an optical fiber having a core and a protective layer; "rough cutting" the optical fiber/buffer layer assembly, if necessary; and inserting the optical fiber into the passageway of the body so that the core and the protective layer extend to a mating front face of the fiber optic connector. The method of making the fiber optic assembly may further include the steps of abutting the optical fiber to a dust cap that includes an index matching gel, securing the optical fiber to the connector, securing a boot to the connector, and/or the other steps described herein such as assembling the fiber optic connector.

One embodiment of optical fiber 10 includes: (i) a multi-mode silica based glass core having a diameter between 80-300 µm and an index of refraction n1; (ii) a cladding surrounding the core having a thickness ≤20 µm and index of refraction n2<n1 with a delta index of refraction between the core and cladding being defined as n1−n2. The cladding includes (a) fluorine doped silica with a relative index of refraction delta <0; or (b) a polymer with relative index of refraction delta <0; (iii) a protective coating having a Young's modulus greater than 700 MPa, a thickness ≤15 µm, and an index of refraction of refraction n3>n2. Further, optical fiber 10 includes a buffer layer 18 as discussed herein.

A more specific variation of optical fiber 10 may include a glass core with a graded index with a 175 µm to 225 µm diameter where the cladding is a fluorinated polymer and has a thickness between 10 μm to 15 μm, and the protective coating having the a thickness of ≤10 μm. Additionally, the buffer layer 18 may have a shore D hardness of at least 60.

One advantage of the disclosed optical fibers is that the protective coating minimizes the fiber movement inside the buffer layer during "rough cutting" and also during subsequent use in the fiber optic connector, due to strong adhesion of the protective coating to both the cladding and the buffer layer. Yet another advantage the optical fibers disclosed is that the protective coating prevents the optical fiber core from moving off-center during "rough cutting", thus minimizing coupling losses when this fiber is coupled to another optical fiber. Yet another advantage of the optical fibers disclosed is that the protective coating also provides protection during handling and storage if the buffer layer is not applied at the same time as the protective coating.

According to at least some embodiments a fiber optic connector comprises: (i) a housing sized to receive a ferule; and (ii) a ferrule situated within said housing, the ferrule having a bore extending from a rear of the ferrule to a front of the ferrule and an end stop sized to engage the buffer layer and to contain the optical fiber within said ferrule. The bore is sized to receive and guide an optical fiber and a buffer layer to a front end face of the ferrule. According to some embodiments, the bore has a diameter of about 250 microns or greater at the front end face. According to some embodiments, the fiber optic connector further includes an optical fiber situated within the bore, wherein (i) the end stop is in contact with the buffer layer and (ii) the end face of the optical fiber is aligned to the other end face of said ferrule such that the distance between the end face of said optical fiber and the other end face of said ferrule is less than 0.005", preferably less than 0.002". Preferably the optical fiber is a silica-based optical fiber and has an end face that is not polished to a fine finish.

According to at least some embodiments a method for making a fiber optic connector assembly comprises the steps of: (i) providing a ferrule having a bore therethrough and a front end face and an end stop situated adjacent to said front end face; (ii) providing an optical fiber having a core and a protective layer; and (iii) inserting the optical fiber into the bore of the ferrule, so that the core and the protective layer extend to the front end face of the ferrule, and said protective layer is in contact with the end stop. According to some embodiments the method further includes the step of securing the optical fiber to the connector. According to some embodiments the method further comprises the step(s) of inserting the cleaved or cut fiber in the connector without stripping the buffer layer, such that the cut or cleaved end face of the fiber is situated adjacent to said front end face. Preferably, the distance between the cut or cleaved end face of said optical fiber and the frontend face of said ferrule is less than 0.005". According to some embodiments the method further includes at least one of the following: no polishing of fiber end surface, no stripping of any coatings; no curing of adhesive(s). According to some embodiments the method further includes the step of placing the cut or cleaved fiber into an optical connector; placing anther fiber in the connector, wherein the cut or cleaved fiber is optically coupled to the other fiber. In some embodiments the method further includes the step placing a quantity of gel between the two optical fibers. In some embodiments the two optical fibers are not attached to one another by an adhesive.

According to at least some embodiments the optical fiber is a silica-based optical fiber and not polished.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

We claim:

1. A ferrule fiber assembly, comprising:
   (i) ferule having a bore extending from a rear of the ferrule to a front of the ferrule, wherein the bore is sized to receive a single optical fiber comprising a core, a cladding, a coating, and a buffer layer situated on said coating at one end face of the ferrule; and end stop sized to engage the buffer layer and to contain the optical fiber with said buffer layer within said ferrule; and
   (ii) a single optical fiber situated within said bore, wherein said fiber includes the core, the cladding, the coating, said coating having a Young's modulus greater than 700 MPa, and the buffer layer wherein (i) said end stop is in contact with said buffer layer and (ii) the end face of said optical fiber is aligned to the other end face of said ferrule such that the distance between the end face of said optical fiber and the other end face of said ferrule is less than 0.005".

2. The ferrule of claim 1, wherein the distance between the end face of said optical fiber and the other end face of said ferrule is not greater than 0.002".

3. The ferrule of claim 1, wherein said bore has a larger diameter than that of the fiber buffer.

4. The ferrule of claim 1, wherein, said end stop includes a tapered surface or a tapered lip structured to engage at least the buffer layer of said optical fiber.

5. The ferrule of claim 1, wherein said bore has a larger diameter than that of the buffer layer.

6. A ferrule-fiber assembly, comprising:
   (I) a ferrule having a bore extending from a rear of the ferrule to a front of the ferrule, wherein the bore is sized to receive an optical fiber comprising a core, a cladding, a coating, and a buffer layer at one end face of the ferrule; and end stop sized to engage the buffer layer and to contain the optical fiber with said buffer layer within said ferrule;
   (II) an optical fiber situated within said bore, wherein (i) said end stop has a tapered surface or a tapered lip that is in contact with said buffer layer and (ii) the end face of said optical fiber is aligned to the other end face of said ferrule such that the distance between the end face of said optical fiber and the other end face of said ferrule is less than 0.005 wherein said end stop includes a tapered surface or a tapered lip that engages said fiber.

7. A fiber optic connector, comprising:
   a housing sized to receive a ferrule; and
   the ferrule situated within said housing, said ferrule having a bore, the bore extending from a rear of the ferrule to a front of the ferrule, wherein the bore is sized to receive and guide an optical fiber having a core, a cladding, and a buffer layer through the entirety of the bore of the ferrule from a rear end of the ferrule to a front end face of the ferrule; and an end stop with a tapered surface situated adjacent to said front end and sized for the tapered surface to engage the buffer layer and to contain the optical fiber within said ferrule.

8. The fiber optic connector of claim 7, wherein the bore has a diameter of about 250 microns or greater at the front end face.

9. The fiber optic connector of claim 7, further including an optical fiber situated within said bore, wherein (i) said tapered surface of the end stop is in contact with said buffer layer and (ii) the end face of said optical fiber is aligned to the other end face of said ferrule such that the distance between the end face of said optical fiber and the other end face of said ferrule is less than 0.005".

10. The fiber optic connector of claim 9, wherein the optical fiber is a silica-based optical fiber.

11. The fiber optic connector of claim 9, wherein the optical fiber is not polished to a fine finish.

12. The fiber optic connector of claim 9, wherein optical fiber has a core that is 80 microns or greater.

13. The fiber optic connector of claim 9, further including a retaining structure for securing the optical fiber to the fiber optic connector.

14. The fiber optic connector of claim 9, further including a retaining structure defining a crimp feature or a camming feature, or a cantilever arm structure with threaded compression nut, for securing the optical fiber to the fiber optic connector.

15. The fiber optic connector of claim 9, further including a ferrule holder, a crimp body, a spring, and a spring push, and a boot.

16. A fiber optic connector, comprising:
a housing sized to receive a ferrule; and
the ferrule situated within said housing, said ferrule having a bore, the bore extending from a rear of the ferrule to a front of the ferrule, wherein the bore is sized to receive and guide an optical fiber having a core, a cladding, and a buffer layer through the entirety of the bore of the ferrule from a rear end of the ferrule to a front end face of the ferrule; and
an end stop with a tapered surface situated adjacent to said front end and sized to engage the buffer layer and to contain the optical fiber within said ferrule wherein (i) said end stop is in contact with said buffer layer and (ii) the end face of said optical fiber is aligned to the other end face of said ferrule such that the distance between the end face of said optical fiber and the other end face of said ferrule is less than 0.005", wherein the optical fiber has a protective coating extending through the bore, said coating having with a Young's modulus greater than 700 MPa and a thickness of 15 microns or less.

17. A method for making a fiber optic connector assembly, comprising:
(i) providing a ferrule having a bore therethrough and a front end face and an end stop situated adjacent to said front end face, said end stop includes a tapered surface or a tapered lip structured to engage at least the buffer layer of an optical fiber;
(ii) providing a single optical fiber having a core, a cladding, and a protective layer; and
(iii) inserting the single optical fiber into the bore of the ferrule so that the core, cladding, and the protective layer extend to the front end face of the ferrule with an end face of the optical fiber being adjacent to said front end of the ferrule, and said protective layer at at least said end face is in contact with the tapered surface or a tapered lip of said end stop.

18. The method of claim 17, wherein optical fiber is a silica-based optical fiber and not polished.

19. The method of claim 17, further including the step of securing the optical fiber to the connector.

20. The method according to claim 17, further comprising cleaving or cutting said fiber and inserting said cleaved or cut fiber in a connector without stripping said buffer such that the cut or cleaved end face of the fiber is situated adjacent to said front end face, and distance between the cut or cleaved end face of said optical fiber and the front end face of said ferrule is less than 0.005".

21. The method according to claim 20, wherein said method includes at least one of the following: no polishing of fiber end surface, no stripping of any coatings; no curing of adhesive(s).

22. The method according to claim 20, wherein said method includes placing said cut or cleaved fiber into an optical connector; placing another fiber in said connector, wherein said cut or cleaved fiber is optically coupled to said another fiber.

23. The method according to claim 22, including placing a quantity of gel between said optically coupled fibers.

24. The method according to claim 22, wherein said fibers are not attached to one another by an adhesive.

25. A fiber optic connector, comprising:
a housing sized to receive a ferrule; and
the ferrule situated within said housing, said ferrule having a bore, the bore extending from a rear of the ferrule to a front of the ferrule, wherein the bore is sized to receive and guide an optical fiber having a core, a cladding, and a buffer layer through the entirety of the bore of the ferrule from a rear end of the ferrule to a front end face of the ferrule; and
an end stop with a tapered surface situated adjacent to said front end and sized to engage the buffer layer and to contain the optical fiber within said, further including an optical fiber situated within said bore, wherein said optical fiber comprises a core; a cladding; a protective coating surrounding said cladding, said protective coating having a Young's modulus greater than 700 MPa and a thickness≤15 μm; and the buffer layer surrounding said coating.

26. A fiber optic connector, comprising:
a housing sized to receive a ferrule; and
the ferrule situated within said housing, said ferrule having a bore, the bore extending from a rear of the ferrule to a front of the ferrule, wherein the bore is sized to receive and guide an optical fiber having a core, a cladding, and a buffer layer through the entirety of the bore of the ferrule from a rear end of the ferrule to a front end face of the ferrule; and
an end stop with a tapered surface situated adjacent to said front end and sized to engage the buffer layer and to contain the optical fiber within said further including an optical fiber situated within said bore, wherein said optical fiber comprises the core; the cladding; a protective coating surrounding said cladding, said protective coating having a Young's modulus greater than 700 MPa and a thickness≤15 μm; and the buffer layer surrounding said coating, said buffer layer having with shore D hardness of at least 60.

* * * * *